United States Patent
Amthor et al.

(10) Patent No.: US 12,055,380 B2
(45) Date of Patent: Aug. 6, 2024

(54) MICROSCOPE AND METHOD FOR DETERMINING A DISTANCE TO A SAMPLE REFERENCE PLANE

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 196 days.

(21) Appl. No.: 17/375,110

(22) Filed: Jul. 14, 2021

(65) Prior Publication Data
US 2022/0018652 A1    Jan. 20, 2022

(30) Foreign Application Priority Data
Jul. 16, 2020   (DE) ............. 10 2020 118 801.3

(51) Int. Cl.
| | |
|---|---|
| *G01B 11/14* | (2006.01) |
| *G02B 21/24* | (2006.01) |
| *G02B 21/26* | (2006.01) |
| *G02B 21/36* | (2006.01) |

(52) U.S. Cl.
CPC ............ *G01B 11/14* (2013.01); *G02B 21/241* (2013.01); *G02B 21/26* (2013.01); *G02B 21/365* (2013.01)

(58) Field of Classification Search
CPC .... G02B 21/241; G02B 21/26; G02B 21/365; G01B 11/14
USPC ......................................................... 348/79
See application file for complete search history.

(56) References Cited

U.S. PATENT DOCUMENTS

| | | | |
|---|---|---|---|
| 4,965,840 | A | 10/1990 | Subbarao |
| 9,826,156 | B1 * | 11/2017 | Liu ................. H04N 23/45 |
| 9,827,054 | B2 | 11/2017 | Richmond et al. |
| 10,575,828 | B2 | 3/2020 | Dunlap et al. |

(Continued)

FOREIGN PATENT DOCUMENTS

| | | |
|---|---|---|
| DE | 3880975 T2 | 12/1993 |
| DE | 102012211734 A1 | 1/2014 |

(Continued)

OTHER PUBLICATIONS

Winterfelt, Search Report for DE10202011801.3, Nov. 11, 2020, 7 pages (English translation not available).

*Primary Examiner* — Joseph G Ustaris
*Assistant Examiner* — Jimmy S Lee
(74) *Attorney, Agent, or Firm* — LaBatt, LLC

(57) ABSTRACT

A method for determining a distance of a sample reference plane of a sample carrier from a reference plane of a microscope, the microscope including a sample stage for the sample carrier and a camera, comprises the following steps: taking an overview image of the sample carrier by means of the camera; evaluating the overview image and thus detecting at least one characteristic of the sample carrier; ascertaining contextual data of the characteristic from a data set; and determining the distance of the sample reference plane from the reference plane based on the characteristic and the contextual data of the sample carrier. A microscope configured to determine the distance of the sample reference plane of the sample carrier from the reference plane is also described.

15 Claims, 8 Drawing Sheets

(56) References Cited

U.S. PATENT DOCUMENTS

| | | | |
|---|---|---|---|
| 2015/0022652 A1* | 1/2015 | Joo | G01B 11/022 |
| | | | 348/92 |
| 2017/0143429 A1* | 5/2017 | Richmond | A61B 34/37 |
| 2018/0341825 A1* | 11/2018 | Minato | G01N 30/24 |
| 2019/0328464 A1 | 10/2019 | Saur et al. | |
| 2020/0074303 A1* | 3/2020 | Chu | G06V 10/82 |
| 2020/0200531 A1 | 6/2020 | Amthor et al. | |
| 2020/0326179 A1* | 10/2020 | Tong | G01B 11/026 |
| 2020/0338744 A1* | 10/2020 | Wang | G05D 1/0238 |
| 2020/0382715 A1* | 12/2020 | Hong | G02B 7/38 |

FOREIGN PATENT DOCUMENTS

| | | |
|---|---|---|
| DE | 202014103766 U1 | 12/2014 |
| DE | 102018206406 B3 | 9/2019 |
| DE | 102018219867 A1 | 5/2020 |
| DE | 102018133188 A1 | 6/2020 |
| WO | 2017157763 A1 | 9/2017 |

* cited by examiner

MICROSCOPE AND METHOD FOR DETERMINING A DISTANCE TO A SAMPLE REFERENCE PLANE

REFERENCE TO RELATED APPLICATIONS

The current application claims the benefit of German Patent Application No. 10 2020 118 801.3, filed on 16 Jul. 2020, which is hereby incorporated by reference.

FIELD OF THE DISCLOSURE

The present disclosure relates to a microscope and a method for determining a distance of a sample reference plane of a sample carrier from a reference plane of a microscope.

BACKGROUND OF THE DISCLOSURE

Knowing the position of a sample reference plane of a sample carrier is important for different operations in microscopy. An example of such an operation is the avoidance of collisions between microscope components and the sample carrier or sample stage. Another example is the focusing on a sample plane, to which end the position of the sample reference plane can be used in a first step to perform a coarse focusing on the sample reference plane or a plane derived therefrom. A fine focusing by means of a further measurement or a captured image follows.

Knowing the position of a sample reference plane of the sample carrier is particularly important when using sample carriers of different heights, e.g. different multi-well plates. In such cases, simply knowing a height position of the sample stage is not sufficient.

A sample reference plane can generally be understood to be a plane that describes a position of the sample carrier. For example, the sample reference plane can indicate the top or bottom side of the sample carrier and/or lie parallel to the top or bottom side of the sample carrier. If the sample carrier is moved in a direction along the z-axis, i.e. along an optical axis of the microscope, then the sample reference plane moves in the same z-direction together with the sample carrier.

In principle, the reference plane denotes any definable plane defined to be parallel to the sample reference plane and that remains stationary when the sample is moved. The reference plane is thus independent of the current position of the sample carrier. For example, the reference plane can be defined in relation to the microscope stand.

Different methods for determining the distance to the sample reference plane have been developed based on the evaluation of overview images. For example, in a method developed by the Applicant and described in the as yet unpublished patent application DE 10 2018 133 188, a plurality of overview images of the sample carrier are taken from different angles. Using triangulation, it is then possible to infer the distance from the overview camera or overview cameras to the sample carrier from differences in perspective between the overview images. This method requires either two overview cameras or there must be a defined relative movement between the sample carrier and the overview camera between the capture of two successive overview images.

SUMMARY OF THE DISCLOSURE

It can be considered an object of the invention to provide a microscope and a method with which it is possible to determine a position of a sample carrier as quickly and reliably as possible with a simple apparatus.

This object is achieved by means of the method with the features of claim 1 and by means of the microscope with the features of claim 13.

A method according to the invention for determining a distance of a sample reference plane of a sample carrier from a reference plane of a microscope, said microscope including a sample stage for the sample carrier and a camera, comprises at least the following steps: taking an overview image of the sample carrier by means of the camera; evaluating the overview image and thus detecting at least one characteristic of the sample carrier; ascertaining contextual data of the characteristic from a data set; and determining the distance of the sample reference plane from the reference plane based on the characteristic and the contextual data of the sample carrier.

A microscope according to an embodiment of the invention comprises an evaluation unit configured to carry out the method according to the invention.

A microscope according to a further embodiment of the invention comprises a distance determination system comprising a sample stage for a sample carrier, a camera aimed at the sample stage and an evaluation unit in communication with the camera via a corresponding connection. The evaluation unit comprises a data storage system for storing an overview image of the sample carrier on/in the sample stage. The evaluation unit further comprises a trained machine learning model, which includes a trained reference model that is trained by a set of annotated training images of sample carriers and configured so that a characteristic of the sample carrier is detectable in the captured overview image. The evaluation unit further comprises a distance determination unit adapted to determine the distance of a sample reference plane from a reference plane of the microscope based on the detected characteristic of the sample carrier on/in the sample stage and at least one associated piece of contextual data.

This way, a distance can be determined based on a single overview image alone. It is thus not absolutely necessary to provide a second camera for capturing overview images, nor is it absolutely necessary for a plurality of overview images to be captured successively by the same camera. This permits a fast and simple distance determination.

Optional Embodiments

Advantageous variants of the microscope according to the invention and of the method according to the invention are the object of the dependent claims and will be explained in the following description.

Characteristic of the Sample Carrier

The characteristic of the sample carrier can be a part of the sample carrier or a component that is either connected to the sample carrier or at least contacts the same so that a position of this component provides information regarding the position or height of the sample carrier. This component or this part of the sample carrier is designated as a characteristic, as its depiction in the overview image depends on the distance of the sample carrier from the camera and can be used to identify the sample carrier and/or determine its distance from the camera.

The characteristic is identified by means of an image processing of the overview image, which is carried out by an image processing algorithm.

Use of Reference Object as Characteristic

The characteristic can in particular be a reference object or comprise such a reference object. A reference object is an object whose physical dimensions are known in advance.

The respective physical dimensions of one or more reference objects can be saved in the data set. It is thus possible by means of the data set to determine contextual data/contextual information associated with the reference object identified in the overview image in the form of a known (physical) size and/or geometry of the reference object.

The distance from the reference plane can be determined through an evaluation of the depiction of the reference object in the overview image, wherein the known physical dimensions of the reference object are taken into account.

The reference object, depending on its type, may be permanently connected to the sample carrier or be an integral part of the sample carrier or may be removed upon completion of the distance determination. The reference object thus does not necessarily have to be present on the sample carrier for subsequent analyses with the microscope. Rather, it is quite sufficient if it is placed or positioned on the sample carrier solely for the distance determination.

An imaging processing algorithm can be designed in particular to be able to identify one or more of the reference objects described in the following in the overview image.

A calibration slide with a known pattern (e.g. a chessboard pattern) or a known shape or size can be used as the reference object. The distance of the pattern from the camera and thus the distance of the sample reference plane from the reference plane can be inferred from the distortion of the pattern as well as the size of the pattern in the overview image by taking the known physical size of the pattern into account. In the case of a chessboard pattern consisting of squares of a known physical size, the distance can be inferred, for example, from the size and the angle of such a square in the overview image. In this connection, it is possible to use, for example, generally known rules of geometry which describe perspective images. Instead of a pattern, it is also possible to use the shape and size of the calibration slide by, for example, determining the edges of the calibration slide in the overview image. The extension of the edges in the overview image can then be evaluated analogously to the chessboard pattern. The calibration slide can optionally be laid on top of a sample carrier that contains one or more samples to be analyzed. The calibration slide can then be removed for any microscope operations or analyses that follow. It is possible to determine the position of the calibration slide, i.e. its distance from the camera, this way; as the height of the calibration slide is known, it is then possible to calculate the position of the sample carrier, i.e. its distance from the camera, from the position of the calibration slide.

The reference object can also be an adhesive label, an imprint or characters on the sample carrier. The adhesive label or imprint can exhibit a pattern (e.g. a chessboard pattern) or a logo such as a logo of the manufacturer. Generally speaking, the characters can be any characters; in particular, they can relate to the sample, indicate the manufacturer or be a column number or row number of a multi-well plate. The important thing is that the physical dimensions of such a reference object are known and can be used as contextual data.

A further possible reference object is a sample carrier holder. Such a holder/frame is placed around or onto the sample carrier so that the location of the holder is related to the location of the sample carrier in a known manner. A physical size and/or shape of the holder is known so that the distance can be inferred from the size and/or shape of the holder in the overview image.

A structure on the sample carrier can also constitute a reference object. Such a structure can be formed, for example, by edges/ridges of the sample carrier, by a clip or by some other device for fixing a sample carrier.

Use of a Sample Carrier or Sample Carrier Parts as Characteristic

Image areas of the sample carrier or of sample carrier parts can be identified in the overview image as characteristics, in particular via a segmentation of the overview image. A sample carrier part can be, for example, a corner area of the sample carrier or a sample receptacle or well. The contextual data provide geometric data relating to the physical dimensions and/or shape of the sample carrier or sample carrier parts. For example, the contextual data can indicate an angle of a corner area, e.g., that the corner area of the sample carrier forms a 90° angle. Alternatively or additionally, the contextual data can indicate a physical shape or size of a sample receptacle, in particular that sample receptacles or wells have a circular cross-section. The distance of the sample reference plane from the reference plane is then determined based on the shape and/or size of the identified image areas and on the associated geometric data relating to the actual physical size and/or shape.

It is optionally also possible to identify the type of object carrier from the overview image, in particular as described in greater detail below. If the type of object carrier is known, it is possible to save concrete physical sizes of the sample carrier or sample carrier parts as contextual data, for example a diameter of a sample receptacle. In the absence of a precise knowledge of the object carrier type, it is also possible to use more general geometric information as contextual data, for example, that sample receptacles that appear round or oval in the overview image have a physically circular cross-section, or that sample receptacles/ sample chambers that appear to have four edges in the overview image have a physically rectangular or square cross-section.

Use of Object Carrier Type as Characteristic

The characteristic can alternatively or additionally be an object carrier type or comprise such a type. A type of a sample carrier is thus identified by means of an evaluation of the overview image. The terms "object carrier" and "sample carrier" can be understood as synonyms here. Object carrier types can differ, for example, in terms of make, i.e. model and manufacturer, and relate to different multi-well plates, chamber slides or Petri dishes. An object carrier type can designate a specific model of a manufacturer or a class of object carriers (e.g. Petri dishes as opposed to multi-well plates) that comprises different models of a manufacturer or of different manufacturers.

The identification of an object carrier type can be achieved via an image classification. A segmentation of the overview image into context areas can occur here: for example, the overview image can be segmented into image areas of sample receptacles, into further sample carrier areas and into a background. For instance, it is possible to distinguish between different Petri dish types by their lateral dimensions. These image processing steps can optionally be carried out by a machine learning model, as described below.

Contextual data relating to different object carrier types can be stored in the data set. In particular an object carrier height can be respectively saved for different types of object carriers in the data set. The distance of the sample reference plane from the reference plane can then be determined based on the object carrier height of the object carrier type in question. In addition or alternatively to the object carrier height, it is also possible to store lateral dimensions of the object carrier type and/or dimensions of object carrier parts, for example of sample chambers. A skirt height can also be respectively stored as contextual data for different object carrier types. An object carrier can have a ledge on its outer periphery, in particular for stacking purposes. The skirt height denotes the height of this ledge. The skirt height is in particular suitable for finding or estimating the height of a sample plane. This is especially helpful when an objective views the object carrier from below.

It is optionally also possible to distinguish between object carrier types based on whether or not a given sample carrier is used with a lid. The contextual data of the data set thus indicate corresponding object carrier heights with or without a lid. An identified lid can help to identify the object carrier type in question in the classification. For example, it is possible to detect whether a lid has a smooth surface or comprises circular depressions corresponding to wells. This can provide information on the type of object carrier in question and/or help in the identification of the lid, wherein respective height values can be saved for different lids.

The identified object carrier height indicates a height relative to a sample stage carrying the sample carrier. In order to determine the distance from the reference plane, a height position/position of elevation of the sample stage is considered. For example, it is possible for a sample-stage control unit to output a current elevation setting of a motorized sample stage. Alternatively, it is also possible to determine the current height setting of the sample stage by means of an image processing of the overview image or some other captured image. It is, moreover, also possible to combine the determination of the object carrier height via an identification of the object carrier type with other distance determination approaches described here. For example, the object carrier height can provide information regarding how a sample plane extending through a sample to be analyzed differs from the sample reference plane. This information is helpful, for example, for a (coarse) focusing on the sample plane. Alternatively or additionally, the determined object carrier height and/or associated lateral dimensions of the sample carrier can also be used for avoiding collisions between the sample stage or side walls of the sample carrier and other microscope components.

In some embodiment variants, data relating to distance-dependent overview-image depictions of different object carrier types are saved in the data set. The contextual data thus comprise stored data relating to a distance-dependent overview-image depiction of the identified object carrier type. The distance can now be determined by evaluating geometric properties (e.g. size and/or distortion) of a depiction of the sample carrier in the overview image while taking into account the stored data relating to the distance-dependent overview-image depiction of the identified object carrier type. For example, diameters and/or depths of sample receptacles can be stored in the data set for an object carrier type. The knowledge of the physical diameter of a sample receptacle is then used to infer the distance from the diameter of a sample receptacle in the overview image.

Live Monitoring for the Characteristic

Via image analysis, it is optionally possible to monitor if a characteristic is contained in the overview image or in at least one further overview image. If a characteristic is detected, an automatic determination of the distance occurs in the described manner. This allows in particular a continuous monitoring of the distance during which the camera provides a stream of image data or a video of successive overview images.

Machine Learning Model

Some or all of the steps described in relation to the overview image can also be carried out by a machine learning model. In this case, parameters (weights) of a model are defined by a machine learning process using training data. The model can then carry out the described steps. In particular the detection of the characteristic can occur by means of a machine learning model.

The identification of contextual data of the characteristic from a data set can occur by means of the machine learning model in the sense that the data set in this case does not necessarily consist of lists of entries which thus form the contextual data; rather, the data set can consist in the machine learning model with its learned weights: the contextual data thus result from the learned parameters, or from the overview image when further processed with the learned parameters.

A reference model can be trained by means of machine learning (ML) in particular with the step of evaluating an overview image and thus detecting a characteristic of the sample carrier, as well as the step of determining contextual data of the characteristic, and optionally the step of classifying the sample carrier. The contextual data are implicitly comprised by the model, in particular by weights of the reference model defined by the training.

The different described steps can be carried out by a single machine learning model or a plurality of sequential machine learning models. Variants of described example embodiments comprising a single machine learning model result by splitting the model into a plurality of sequential machine learning models. For example, a first machine learning model can carry out a segmentation of the overview image to identify and localize a characteristic, whereby, e.g., a reference object is identified in the overview image. A second machine learning model uses the image section of the overview image with the characteristic (e.g. the image section containing the reference object) as an input in order to determine and output the sought distance therefrom. The second machine learning model is trained with annotated training images showing depictions of a reference object or different reference objects at different distances, wherein the distances are respectively specified as the target variables (output). Weights of the model are defined by this training. The contextual data identified for the characteristic is thus yielded as an intermediate result in the computational layers of the second machine learning model, while the output of the second machine learning model can be the sought distance.

If a single machine learning model is used, it can be designed to generate the sought distance to the sample reference plane as an output directly from the overview image as an input. The output can lie in a discrete solution space (classification) or in a continuous range (regression). An advantage of this form of realization is that merely overview images of the sample carrier or of different sample carrier types and a corresponding annotation (the respective actual distances) are required for the training process. The model then learns the relationship between image content and distance autonomously. This way, the model can detect structures that are typical of individual sample carriers and store associated heights in the form of model weights. The model can also learn geometric relationships, e.g., that the height of the lid increases in proportion to the diameter in the case of some Petri dishes.

Control or Adjustment System Using Determined Distance

The microscope can comprise at least one component that is configured to be controlled as a function of the determined distance to the sample reference plane. The component can be a motor or actuator for moving another microscope component or be configured to influence a light path, for example, by controlling (in particular acousto-optic or electro-optic) filters or a digital aperture. An example of a controlled component is a focus drive. This focus drive produces a relative movement in the height direction between the sample stage and the observation plane, which is sharply imaged onto a microscope camera by the microscope objective. The observation plane can in particular be set to the sample reference plane or to a height derived from the sample reference plane. The method of the invention can thus form part of an autofocus system.

Another example of a controlled component is an alarm system. An alarm system can output an alarm when there is a risk of collision between the sample carrier or sample stage and another microscope component, for example an objective, an immersion device or a condenser. The alarm system receives the determined distance as well as data relating to the microscope components used—such as their height—as inputs. From these inputs, the alarm system can determine a distance between the sample carrier or sample stage and the relevant microscope components. If the distance falls below a threshold value, the alarm is triggered. The threshold value can be defined in advance or as a function of the inputs of the alarm system, for example as a function of the numerical aperture or other optical properties of an employed objective or depending on whether or not the objective comprises some kind of protection against collisions, i.e. a shock-absorbing front area.

In the case of a motorized sample stage, any translation or movement of the same can occur as a function of the determined distance. It is also possible to form a control loop in which the distance is re-determined with a new overview image following each movement of the sample stage. Alternatively or in addition to a control loop, the described method can also be used to verify a sample stage movement following a height adjustment of the sample stage. If the change in height carried out according to the sample-stage motor system does not match a change in distance determined via the overview images, a negative verification result is output.

The determined distance can be also be used by the evaluation unit for image stitching. In this process, a plurality of overlapping overview images are combined to produce an entire overview image. If the viewing angle of the overview camera is not orthogonal to the sample carrier, then it is necessary to know the distance to the sample carrier in order to combine the overlapping overview images correctly. The determined distance can still also be used for navigation.

General Features

The camera can be an overview camera provided in addition to the microscope camera that captures sample images of the sample via a microscope objective. An overview image is accordingly captured with a lower magnification and a larger field of view than a sample image. The overview camera can be located above or below the sample stage and generally views the sample carrier at an angle relative to the optical axis. The optical axis is determined by the microscope objective in use and can lie on the longitudinal axis of said microscope objective. The overview camera can be arranged on the same side of the sample stage as the microscope objective or on an opposite side. It is also possible for the overview camera to be aimed at the sample carrier from a lateral direction. Such an arrangement is in particular possible when a height or distance determination occurs via a classification of the sample carrier, as an identification of a sample carrier type is in principle also possible via a side view. It is, however, also possible to aim the overview camera can at the sample stage via a deflection element, e.g. via a deflection mirror, which is mounted on an objective changer/revolver and which can be selected instead of the microscope objective.

The camera can also be the microscope camera itself, which can receive light from a microscope objective located in the light path. The microscope camera generally views a surface of the sample carrier orthogonally through said objective. In this scenario, the overview image differs from sample images in terms of its magnification. An objective used to capture the overview image has a lower magnification than an objective used for capturing the sample images.

In particular in the event of a distance determination by means of a classification of the sample carrier, the camera or the associated objective can be telecentric, although it is generally also possible to use non-telecentric objectives.

The distance of the sample reference plane from the reference plane of the microscope corresponds to a height or z-coordinate of the sample reference plane. The definitions of the sample reference plane and of the reference plane can correspond to the statements made in the introductory portion of the description. In particular, the sample reference plane can correspond exactly to a position or height of the top side of the sample carrier or be derived from the same. The sample reference plane can also correspond to the plane of the sample carrier that exhibits the most conspicuous structures in the overview image, thus making it suitable for the evaluation. In principle, the sample reference plane in this case can be a plane at any height between the top side and the bottom side of the sample carrier.

A sample stage or sample carrier support can be understood to denote the microscope components that hold or support a sample carrier. Depending on its design, the sample stage can comprise a supporting surface for a sample carrier or a recess in which a sample carrier is held and/or some other holding device such as a clip or a clamp. It is not absolutely necessary for the sample stage to be movable, neither laterally nor vertically.

The distance determination system can be understood to be the microscope components that play a role in the distance determination, in particular the sample stage, the camera and the evaluation unit. In principle, the evaluation unit and/or the distance determination unit can be any computing device, for example a computer, and can comprise a graphics card on which computations of the optional machine learning model are carried out. The evaluation unit can be arranged next to the microscope stand or at distance from the same, for example when the evaluation unit is designed to include the use of a server or cloud-based computing system. Functions of the evaluation unit and/or of the distance determination unit can be performed in particular by software, which can be saved in a corresponding data storage system. The data storage system can be a technical data memory of any design and also serves to store the digital overview image.

The characteristics of the invention that have been described as additional microscope features also yield, when implemented as intended, variants of the method according to the invention. Conversely, the microscope can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EXAMPLE EMBODIMENTS

Different example embodiments are described in the following with reference to the figures. As a rule, similar components and components that function in a similar manner are designated by the same references.

Figure 1:
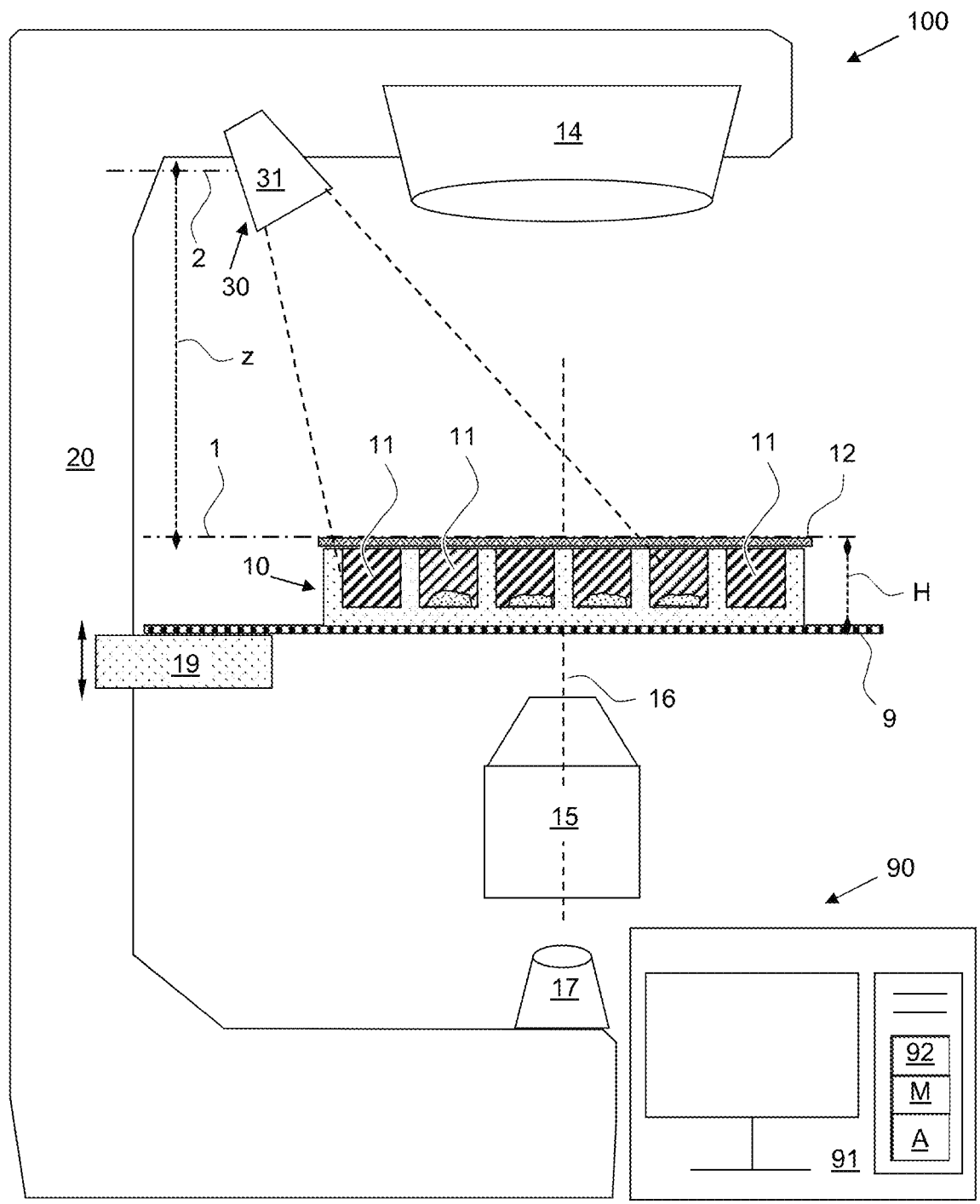
FIG. 1 shows schematically an example embodiment of a microscope according to the invention.

Example Embodiment of FIG. 1

An example embodiment of a microscope 100 according to the invention is shown schematically in FIG. 1.

The microscope 100 comprises a sample stage 9, which is height-adjustable via a focus drive 19 and on which a sample carrier 10 can be positioned. The type of sample carrier 10 provided can vary depending on the measurement situation. In the illustrated example, the sample carrier 10 is a microtiter plate with a plurality of wells or sample receptacles 11 in which a sample can be received.

The microscope 100 further comprises at least one objective 15, which defines an optical axis 16 and which is used to observe one of the samples. The objective 15 conducts detection light from the sample to a microscope camera 17. Further optional components arranged between the objective 15 and the microscope camera 17 are not illustrated in the purely schematic drawing. Illuminating light is conducted via an optional condenser 14 onto the sample.

The microscope 100 further comprises a stand or microscope stand 20 via which microscope components—such as the components of the microscope 100 mentioned in the foregoing—are supported.

The microscope 100 further comprises a camera 30, which is an overview camera 31 here with which an overview image of the sample carrier 10 can be captured.

Potential sample carriers 10 can differ significantly with respect to their shape, size and the number of sample receptacles 11 they comprise. A depth of the sample receptacle 11 and thus a z-plane of the sample to be analyzed can also vary depending on the sample carrier 10. The object carrier height H, which can vary according to the sample carrier 10, is indicated in FIG. 1. A sample carrier 10 can also comprise an optional lid 12, which increases the height H.

The aim here is to obtain a height datum of the sample carrier 10 in a manner that is as simple, as quick and as reliable as possible. To this end, at least one overview image of the overview camera 31 is evaluated. The evaluation is carried out with an evaluation unit 91, which can be constituted, for example, by a computer. The evaluation unit 91 in this example comprises a data storage system 92 with which in particular an overview image is stored, a machine learning model M for evaluating the overview image and a distance determination unit A. The evaluation unit 91 can be configured to carry out the steps of the machine learning model M and of the distance determination unit A in particular by running corresponding software. These steps are described in greater detail with reference to FIGS. 3 to 8. The evaluation unit 91 and the camera 30 can also be called a distance determination system 90.

As illustrated in FIG. 1, the determined height datum of the sample carrier 10 is specified as the distance z of a sample reference plane 1 from a reference plane 2. The sample reference plane 1 designates the position of the sample carrier 10 and can be defined, for example, by the top side of the sample carrier 10 or deviate from the top side in a predetermined manner. The position of the sample reference plane 1 thus varies according to the object carrier height H and as a function of the current height setting of the sample stage 9. The reference plane 2 indicates any definable height plane that is stationary in relation to the microscope stand 20, i.e. especially one that is independent of a setting of the sample stage 9 and independent of the sample carrier 10. In the illustrated example, the reference plane 2 is placed at a camera chip of the overview camera 31. The distance z thus indicates the distance from the camera 30/overview camera 31 here, although the definition of the reference plane—and thus of the distance z—can in principle be varied as desired. In general, the distance z differs from the distance from the camera 30 merely by a freely definable constant. If the distance z is described as the distance from the camera 30 in the following, this is merely intended to facilitate an understanding of the invention and it is understood that it is also possible to define the distance z in relation to another reference plane 2.

A viewing direction of the overview camera 31 is oblique to the optical axis 16 of the objective 15. In the example illustrated in FIG. 1, the overview camera 31 is located above the sample carrier 10 and thus views the top side of the sample carrier 10 at an oblique angle, while the objective 15 is aimed at the sample carrier 10 from below in an inverted configuration. Variations of this illustrative arrangement are possible, as described in the following with respect to FIG. 2.

Figure 2:
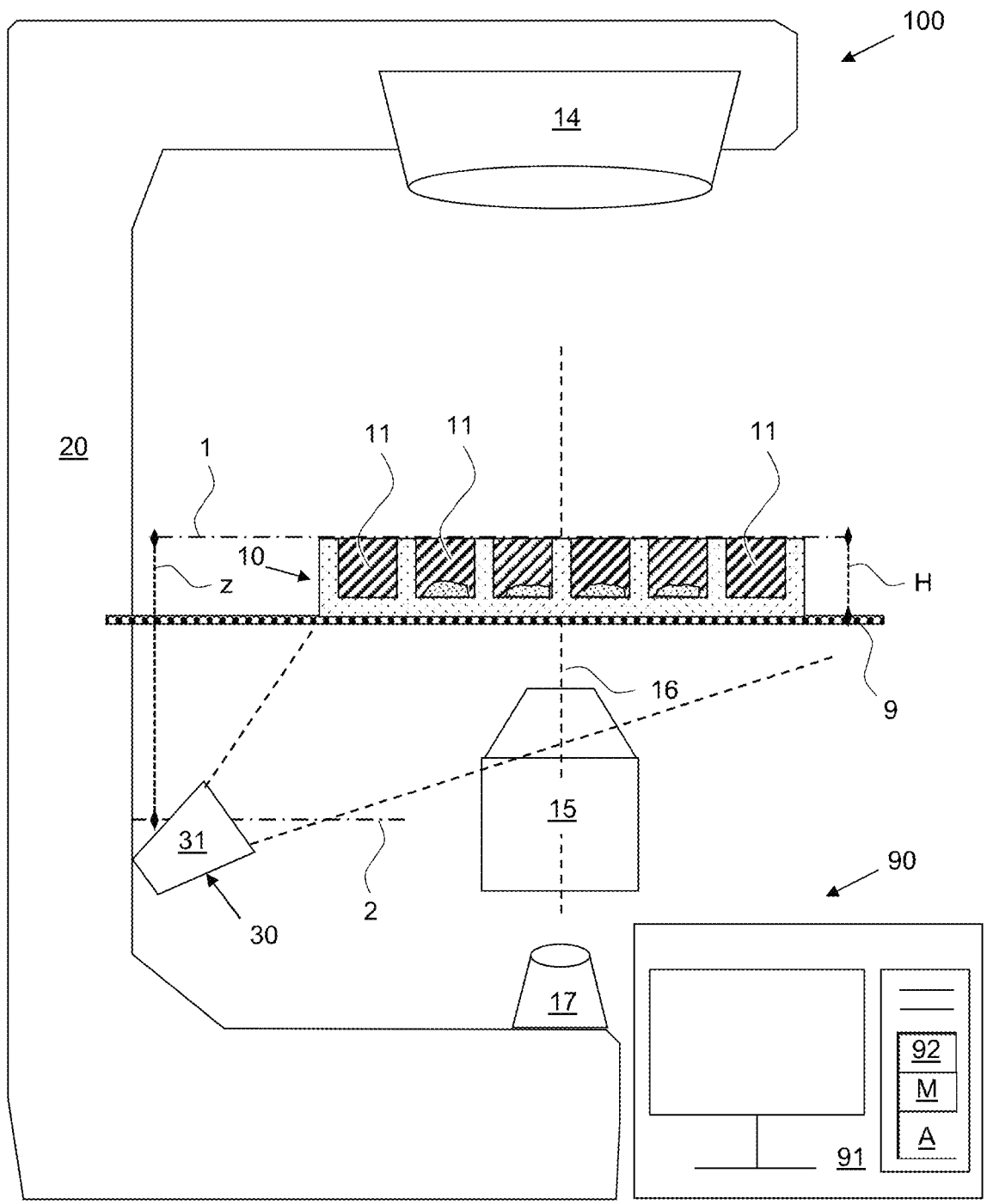
FIG. 2 shows schematically a further example embodiment of a microscope according to the invention.

Example Embodiment of FIG. 2

FIG. 2 shows a further example embodiment of a microscope 100 according to the invention, which differs from the example embodiment shown in the preceding figure by the arrangement of the overview camera 31. The latter is located in FIG. 2 below the sample stage 9 and thus views the sample carrier 10 at an oblique angle from below.

In further variants of FIG. 1 and FIG. 2, an upright configuration is employed in which the objective 15 is located above the sample carrier 10. The condenser 14 illuminates the sample optionally from below and the microscope camera 17 is arranged so that it can receive detection light from the objective 15.

In further variations of FIG. 1 or FIG. 2, the overview camera 31 is omitted and, instead, the microscope camera 17 constitutes the camera 30 with which the overview image is captured. In this case, an objective used to capture an overview image has a lower magnification than an objective used in a subsequent sample analysis.

The evaluation of an overview image is explained in the following.

Figure 3:
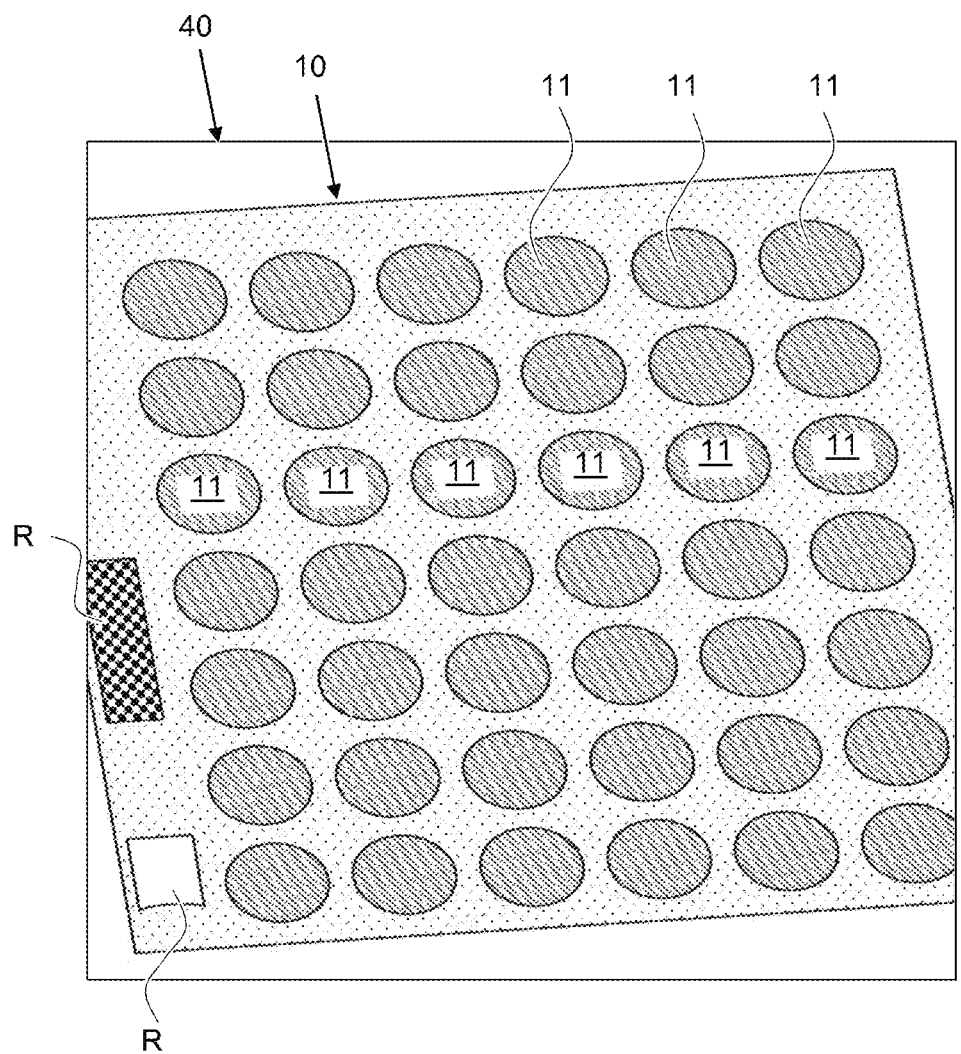
FIG. 3 shows schematically an example of an overview image that might be captured by the microscope shown in FIG. 1.
Figure 4:
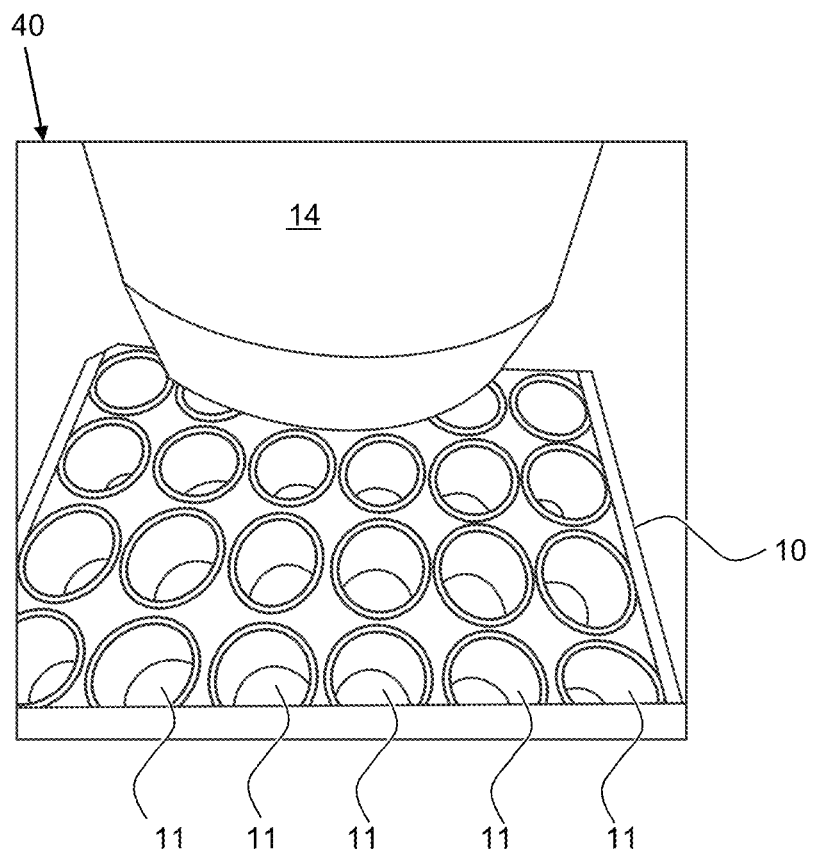
FIG. 4 shows schematically a further example of an overview image that might be captured by the microscope shown in FIG. 1.

FIGS. 3 and 4

FIGS. 3 and 4 are schematic illustrations of examples of an overview image 40 that might be captured, e.g., with the camera 30 illustrated in FIG. 1. The overview image 40 shows at least a section of the sample carrier 10, in this case its top side with a plurality of sample receptacles/vessels 11.

FIG. 3 further shows an affixed or imprinted pattern next to the sample receptacles, which is a chessboard pattern here and which can be used as the reference object R. A manufacturer logo is also indicated on the sample carrier 10, which can also function as the reference object R.

The perspective depiction in the overview image 40 depends on the distance z. In particular size, shape and perspective distortion depend on the distance z. It is thus possible to infer the distance z from the size or geometry in the overview image 40 if the actual physical size or geometry of the object is known. For example, if the physical size of the chessboard pattern or of another reference object R is known, then the distance z can be calculated as a function of the size and perspective distortion of the chessboard pattern in the overview image 40. In principle, the size of the reference object R alone can suffice for this calculation, although lateral variations of the sample carrier 10 generally also influence size in the overview image 40 if the imaging does not occur orthogonally to the sample carrier 10. It is thus often possible to achieve more precise results when distortion is (additionally) evaluated, for example how the angles of the chessboard pattern in the overview image 40 deviate from right angles.

Instead of or in addition to the reference object R, it is also possible to evaluate the shape of the sample carrier 10 in the overview image 40, for example which angles form its edges or how the essentially circular sample receptacles 11 are distorted. It is further expedient in this connection to consider a plurality of sample receptacles 11 together, as a different perspective distortion between the latter provides further information regarding the position of the sample carrier 10 relative to the camera 30.

As implied in FIG. 4, it may also be possible to infer a depth of the sample receptacle 11 from the overview image 40. The determined depth can contribute to the distance determination through the identification of the object carrier type.

Different illustrative evaluation options for determining the distance z are described in the following with reference to FIG. 5.

FIG. 5

Figure 5:
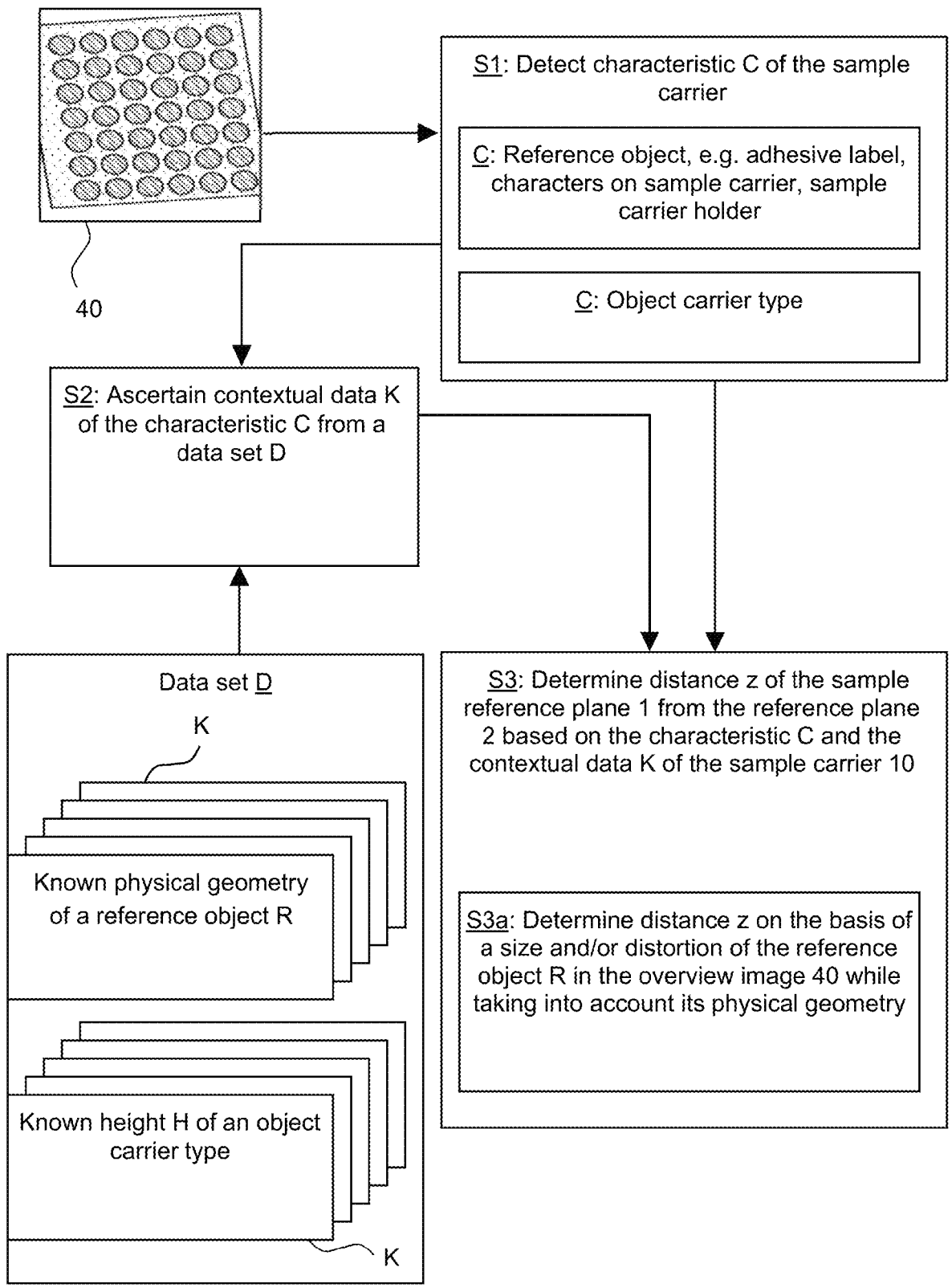
FIG. 5 is a flowchart of steps of an example embodiment of the method of the invention.

FIG. 5 shows a schematic flowchart illustrating steps of an example embodiment of a method according to the invention. The microscope of FIG. 1 or 2, in particular the evaluation unit, can be configured to carry out this method.

First, the overview image 40 is fed to an imaging processing algorithm. As Step S1, the image processing algorithm runs a detection of a characteristic C of the sample carrier 10 in the overview image 40. The characteristic C can be, for example, a reference object R, as described with reference to FIG. 3. Further reference objects R can be, e.g., adhesive labels, characters on the sample carrier, sample carrier mounts, sample carrier holders or generally any object whose size and/or geometry is known and whose position is related to the position of the sample carrier 10.

Alternatively or additionally, an object carrier type can be identified as the characteristic C. The imaging processing algorithm is designed to differentiate between different groups of predetermined object carrier types which differ, for example, in height, shape, the number and the size of provided sample receptacles, in the distance between such sample receptacles or in lateral dimensions of the sample carrier. It is also possible to identify any labels or characters present on the sample carrier using imaging processing to identify the object carrier type.

The imaging processing algorithm is thus designed to ascertain whether or not a given predetermined object (the characteristic) is present in the overview image 40, wherein the depiction of this characteristic C varies with the distance z. The imaging processing algorithm also identifies which pixels in the overview image 40 belong to this characteristic C. This process is called classification.

Step S2 follows, in which contextual information or data K of the characteristic C is determined from a data set D. The data set D can be included in the aforementioned data storage system 92. If the characteristic C is a reference object R, then the contextual data K can be, for example, a physical geometry or size of this reference object R. If the characteristic C is the identified object carrier type, the contextual data K can be the height H of this object carrier type. Corresponding contextual data K can be stored in the data set for numerous different reference objects R and/or object carrier types.

The distance z is then determined by the distance determination unit in Step S3 based on the characteristic C and the contextual data K provided via the data set D. For example, Step S3 can be implemented by Step S3a, which uses the shape and size of the characteristic C in the overview image 40 identified in S1. Since the physical shape and size of the characteristic C are known from the data set D, the distance z can be estimated from the shape and size of the characteristic C in the overview image 40.

The steps described with reference to FIG. 5 can be carried out by one or more machine learning models or by means of a classic imaging processing algorithm without machine learning. A possible usage of a machine learning model is described in the following with reference to FIGS. 6 and 7.

Figure 6:
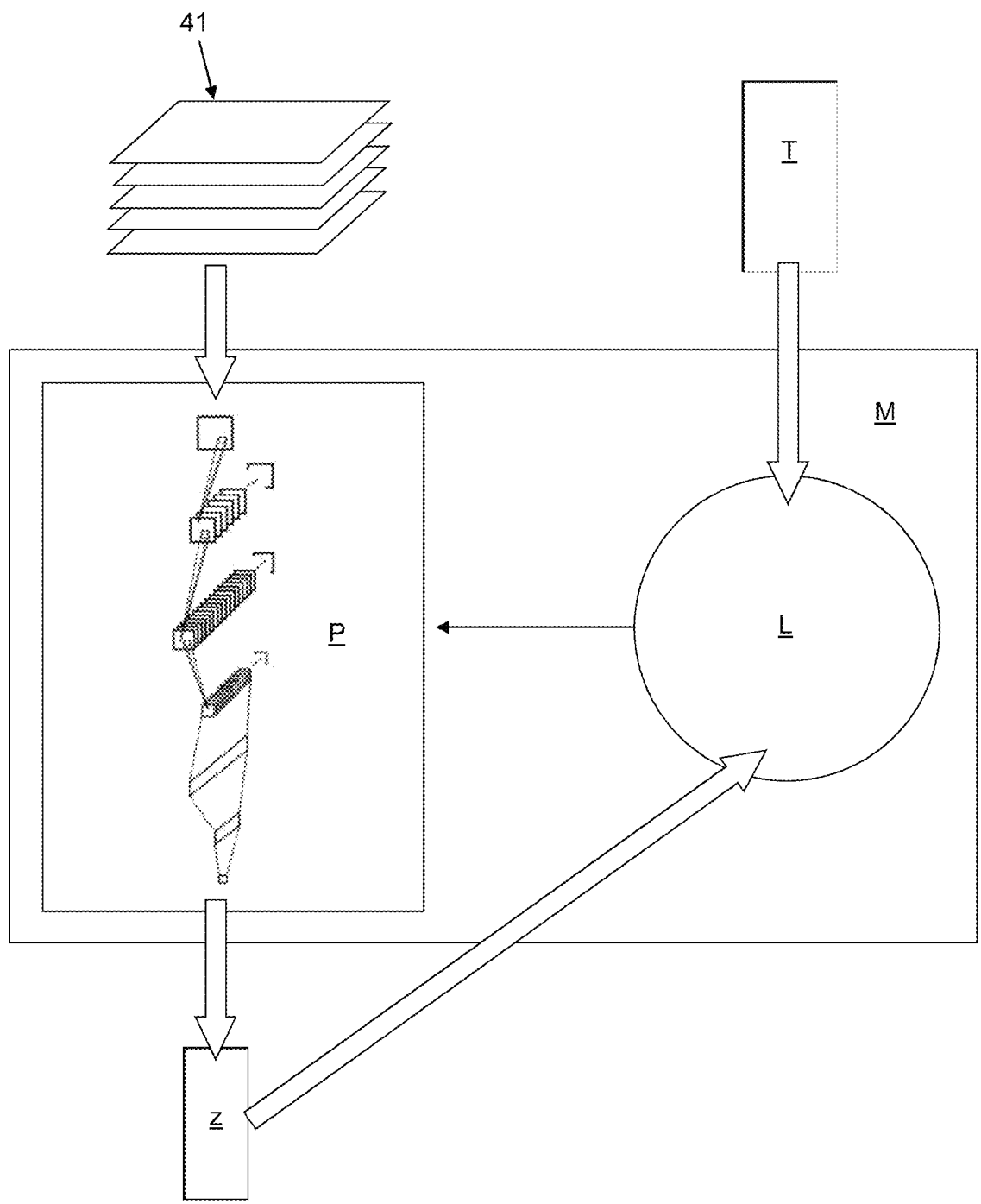
FIG. 6 shows schematically processes of a machine learning model as used in variants of the method and microscope according to the invention.
Figure 7:
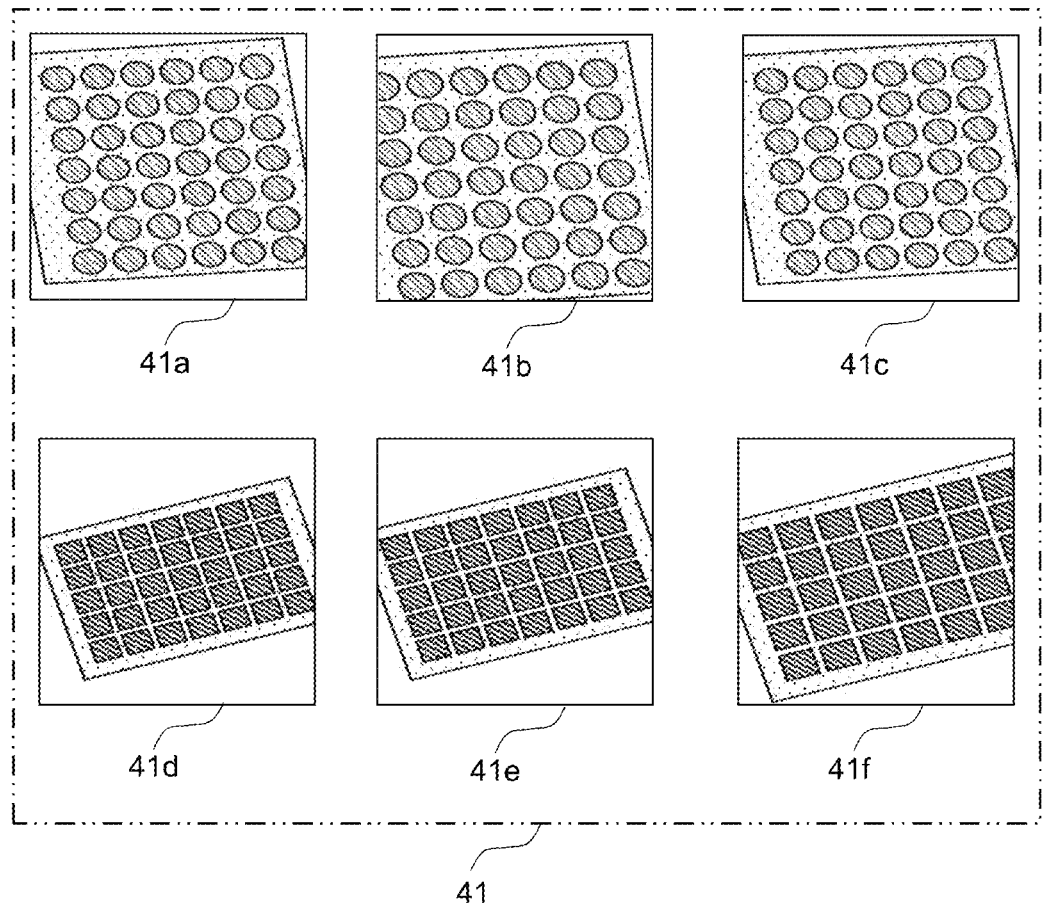
FIG. 7 shows schematically training data for the machine learning model schematically illustrated in FIG. 6.

FIGS. 6 and 7

FIG. 6 illustrates schematically a possible usage of a machine learning (ML) model M in variants of the invention. In this example, the ML model M is intended to be able to calculate a distance z directly from an overview image 40.

Annotated training images 41 are used in this connection. The training images 41 comprise different overview images for which the respective distances are known and specified as the target variable T. This is illustrated in FIG. 7, which schematically shows some of the training images 41 with the corresponding target variable T. The training images 41 comprise a plurality of overview images 41a, 41b, 41c of the same sample carrier or of the same object carrier type, wherein these overview images 41a, 41b, 41c differ with regard to the respective associated distances Ta, Tb, Tc. The training images 41 further comprise overview images 41d, 41e, 41f of another sample carrier or object carrier type, wherein these overview images 41d, 41e, 41f likewise differ with regard to the respective distances Td, Te, Tf. The training images 41 can of course comprise overview images of a plurality of sample carriers or object carrier types.

With reference to FIG. 6, the ML model M comprises a reference model P, which generates a mapping of an input image to a scalar. The scalar represents the estimated distance z here. The reference model P can be or comprise, for example, a neural network, which can be designed in an essentially known manner, for example as a convolutional neural network (CNN) with a plurality of convolutional layers and a plurality of interposed pooling layers. Parameters of the reference model P are typically called weights and determine which scalar the reference model P calculates from an input image (i.e. an overview image 40). The weights are ideally defined by means of the annotated training images 41. The ML model M comprises to this end, in an essentially known manner, a loss or profit function L whose value depends on a difference between the output and the associated target variable T. The ML model M uses an optimization function to modify the current weights of the reference model P as a function of a current value of the loss function L. A new output is computed with the modified weights and the described steps are repeated until the output sufficiently corresponds to the target variable T, i.e. until an extremum of L is reached. The weights of the reference model P are thus fixed as of this point. A microscope 100 of FIG. 1 or 2 can comprise a ready-trained ML model M, i.e. a reference model P with weights that have already been determined. It is not absolutely necessary for further training to be possible here. A microscope 100 with a trained ML model M can thus comprise the trained reference model P alone without the loss function L and without corresponding software for running a training process.

The trained reference model P is able to evaluate an overview image 40 and to use characteristics C in the overview image 40 to infer the distance z. The trained reference model P uses contextual data K derived from the training images 41 in this scenario, wherein the contextual data K take the form of weights. The data set D is thus constituted by the reference model P and its weights.

FIG. 8

Figure 8:
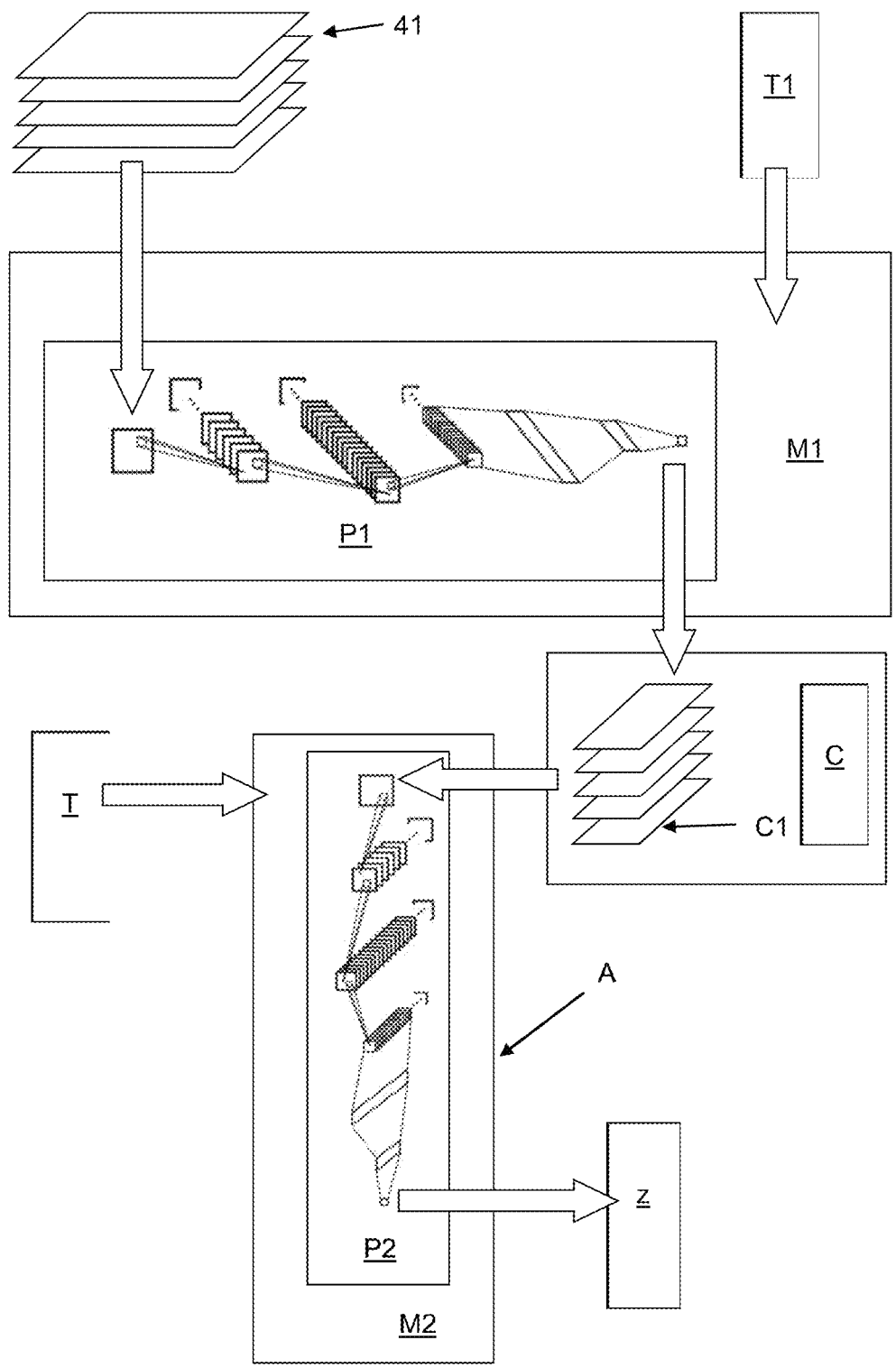
FIG. 8 shows schematically processes of a further machine learning model as used in variants of the method and microscope according to the invention.

FIG. 8 schematically illustrates a further machine learning model of variants of the invention. This ML model consists of a plurality of successive layers. A first layer comprises a machine learning model M1 the function of which is to identify and localize a characteristic C in an overview image. The ML model M1 can also consist of successive units, wherein one unit first performs a segmentation of an overview image in order to localize a characteristic C before another carries out a classification in order to estimate what kind of characteristic C has been found. The ML model M1 receives the training images 41, e.g. the overview images shown in FIG. 7, during the training process. The target variables T1 provided comprise, e.g., the depictions of characteristics C contained in the overview images as well as a classification of the characteristics C, for example an indication of the type of reference object in question. The ML model M1 thereby defines weights of a reference model P1, which allows the reference model P1 to localize and label different characteristics C in an overview image. The output comprises image areas C1 of the characteristics C as well as an indication of the type of characteristic C in question.

A second ML model M2, which represents a distance determination unit A, follows. Its reference model P2 is intended to estimate the sought distance z from the output of the first ML model M1. During the training process, the second ML mode M2 receives the outputs of the first ML model M1 as well as the already known distances as target variables T, as illustrated in FIG. 7. Weights of the reference model P2 are thus defined.

In variants of the illustrated example embodiment, the second ML model M2 can also be replaced by a classic imaging processing algorithm without machine learning components. In this case, e.g., lengths and shapes of the image areas C1 of the characteristics C output by the first ML model M1 are measured. An analytic model can be stored which computes a distance z from these lengths or shapes. The analytic model can determine the distance z in particular from the roundness of sample receptacles or the displayed angles of sample carrier structures in the overview image which physically form a right angle, e.g., coverslip edges, corners of rectangular sample receptacles or an outer corner of the sample carrier.

The illustrated example embodiments share the advantage that a sample reference plane can be determined easily and quickly without requiring a complex apparatus. It is possible to combine features of different example embodiments. Individual features can also be omitted or varied within the scope of the attached claims.

LIST OF REFERENCES

1 Sample reference plane
2 Reference plane
9 Sample stage
10 Sample carrier
11 Sample receptacle of the sample carrier 10
12 Lid of the sample carrier 10
14 Condenser
15 Objective/Microscope objective
16 Optical axis of the objective 15
17 Microscope camera
19 Focus drive
20 Microscope stand
30 Camera
31 Overview camera
40 Overview image
41, 41a-41f Training images
90 Distance determination system
91 Evaluation unit
92 Data storage system
100 Microscope
A Distance determination unit
C Characteristic
C1 Image area of a characteristic C in the overview image 40
D Data set
H Object carrier height
K Contextual data
L Loss function
M, M1, M2 Machine learning model
P, P1, P2 Reference model of a machine learning model
R Reference object on the sample carrier 10
S1, S2, S3, S3a Steps of a method according to the invention
T, T1 Target variables during the training of a machine learning model
Ta-Tf Predetermined target variables for different training images 41a-41f
z Distance

We claim:

1. A method for examining a sample contained in a sample carrier with a microscope, including:
determining a distance of a sample reference plane of a sample carrier from a microscope reference plane, the microscope comprising a sample stage for the sample carrier, a microscope camera, and an overview camera distinct from the microscope camera, wherein the determining comprises the following steps:
taking an overview image of the sample carrier with the overview camera;
evaluating the overview image and thus detecting at least one sample carrier characteristic, the sample carrier characteristic being a property of the sample carrier or a property of an object at the sample carrier;

ascertaining contextual data of the sample carrier characteristic from a data bank, wherein the contextual data is indicative of geometrical information of the sample carrier or a sample carrier part and wherein the data bank includes respective geometrical information for different types of sample carriers or sample carrier characteristics; and determining the distance of the sample reference plane of the sample carrier from the microscope reference plane in a direction of an optical axis of an objective of the microscope, based on the sample carrier characteristic and the contextual data of the sample carrier including the geometrical information of the sample carrier or a sample carrier part loaded from the data bank;

using the determined distance to adjust a relative height between the sample carrier and a focus of the microscope camera which uses the objective, wherein the objective is not used by the overview camera in recording the overview image; and capturing a sample image of the sample contained in the sample carrier with the microscope camera after the relative height has been adjusted.

2. The method of claim 1, wherein the sample carrier characteristic is a reference object that has at least one of a known size and a known geometry as contextual data.

3. The method of claim 2, wherein the reference object is a calibration slide, an adhesive label, a holder for sample carriers, a structure on the holder for sample carriers or characters on the sample carrier.

4. The method of claim 1, wherein image areas of the sample carrier or of sample carrier parts are identified in the overview image as the sample carrier characteristic;

the contextual data indicate geometric data relating to physical dimensions or a shape of the sample carrier or sample carrier parts; and the distance of the sample reference plane from the microscope reference plane is determined based on the shape or size of the identified image areas and the associated geometric data relating to the actual physical size or shape.

5. The method of claim 4, wherein the sample carrier parts whose image areas are identified in the overview image represent at least one sample receptacle;

the contextual data comprise an indication of a physical shape or size of the sample receptacle; and the distance is determined based on the size or shape of the image areas of the at least one sample receptacle and based on the indication of the physical shape or size of the sample receptacle.

6. The method of claim 1, wherein a classification is carried out in which an object carrier type of the sample carrier is identified as the sample carrier characteristic and contextual data are stored in the data bank-set for different object carrier types.

7. The method of claim 6, wherein object carrier heights for different object carrier types are stored in the data bank as contextual data; and the distance of the sample reference plane from the microscope reference plane is determined based on the object carrier height of the presently provided object carrier type.

8. The method of claim 6, wherein the classification comprises a distinction of whether or not the sample carrier has a lid.

9. The method of claim 1, wherein data relating to distance-dependent overview-image depictions of different object carrier types are stored in the data bank;

the contextual data comprise stored data relating to a distance-dependent overview-image depiction of the identified object carrier type; and the distance is determined by evaluating geometric properties of a depiction of the sample carrier in the overview image while taking into account the stored data relating to the distance-dependent overview-image depiction of the identified object carrier type.

10. The method of claim 1, wherein a reference model implicitly comprising the contextual data is trained by means of machine learning with the step of evaluating the overview image and thus detecting the sample carrier characteristic of the sample carrier and the step of ascertaining contextual data of the sample carrier characteristic.

11. The method of claim 1, wherein the detection of the sample carrier characteristic occurs by means of a machine learning model.

12. The method of claim 1, further comprising monitoring by means of image analysis whether the sample carrier characteristic is contained in the overview image or in a further overview image and, if this is the case, automatically determining the distance.

13. A microscope for examining a sample contained in a sample carrier, the microscope comprising:

a distance determination system, the distance determination system comprising:
  a sample stage for a sample carrier;
  an overview camera aimed at the sample stage for recording an overview image;
  an evaluation unit comprising:
    a) a data storage for storing the overview image of the sample carrier at the sample stage;
    b) a trained machine learning model, wherein the trained machine learning model includes a trained reference model that is trained by a set of annotated training images of sample carriers and thus configured so that a sample carrier characteristic is detectable in the captured overview image, the sample carrier characteristic being a property of the sample carrier or a property of an object at the sample carrier; and
    c) a distance determination unit adapted to determine a distance of a sample reference plane of the sample carrier from a microscope reference plane in a direction of an optical axis of an objective of the microscope, based on the detected sample carrier characteristic at the sample stage and associated contextual data including the geometrical information of the sample carrier or a sample carrier part loaded from the data bank;

an objective;

a microscope camera for recording a sample image, wherein the microscope camera is distinct from the overview camera and the objective is arranged to be used by the microscope camera for recording the sample image but not for recording the overview image; and a component configured to be controlled as a function of the determined distance to adjust a relative height between the sample carrier and a focus of the microscope camera, wherein the microscope is configured to record the sample image of the sample contained in the sample carrier with the microscope camera after the relative height has been adjusted.

14. The microscope of claim 13, wherein the evaluation unit is configured to carry out the method of claim 1.

15. The microscope of claim 13, wherein the component includes a focus drive or an alarm system.

* * * * *